Sept. 16, 1930.                D. C. OBER ET AL                1,775,776
            JOINT FOR HIGH VOLTAGE SINGLE CONDUCTOR CABLES
                           Filed Oct. 1, 1923            4 Sheets-Sheet 3
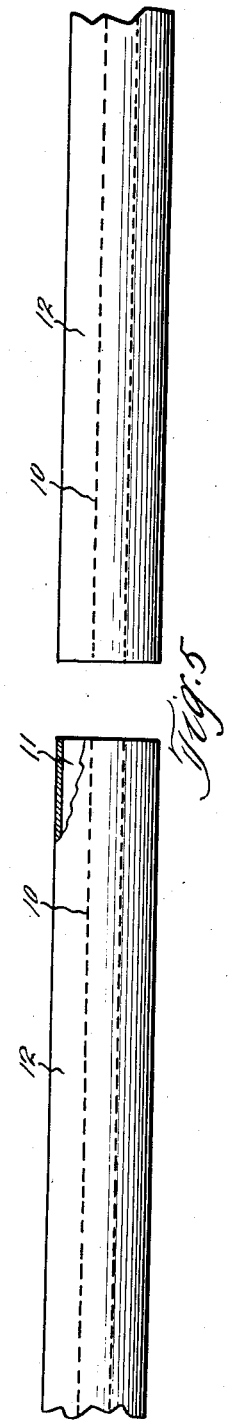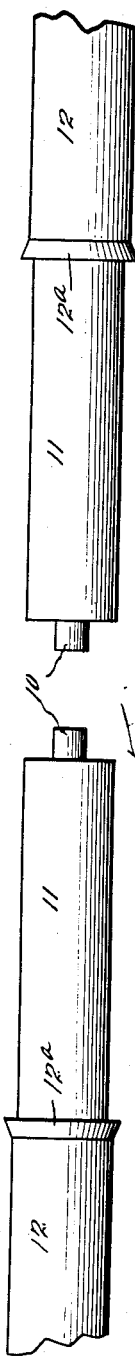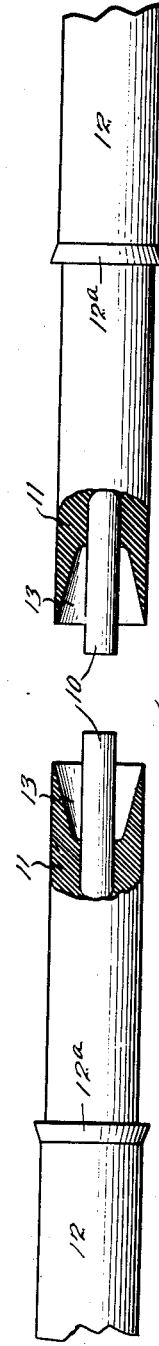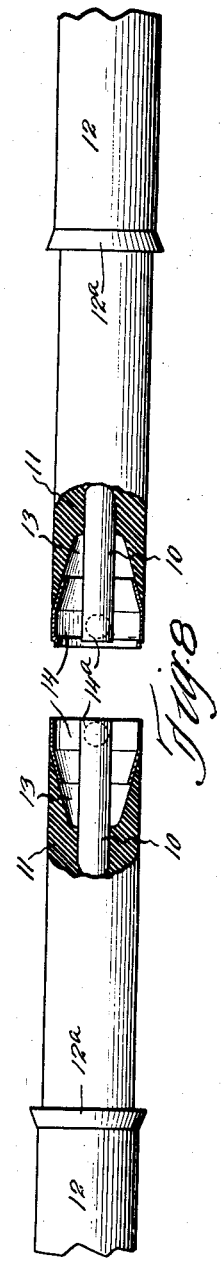
Inventors
D. C. Ober
& A. R. Askue
By
Attys.

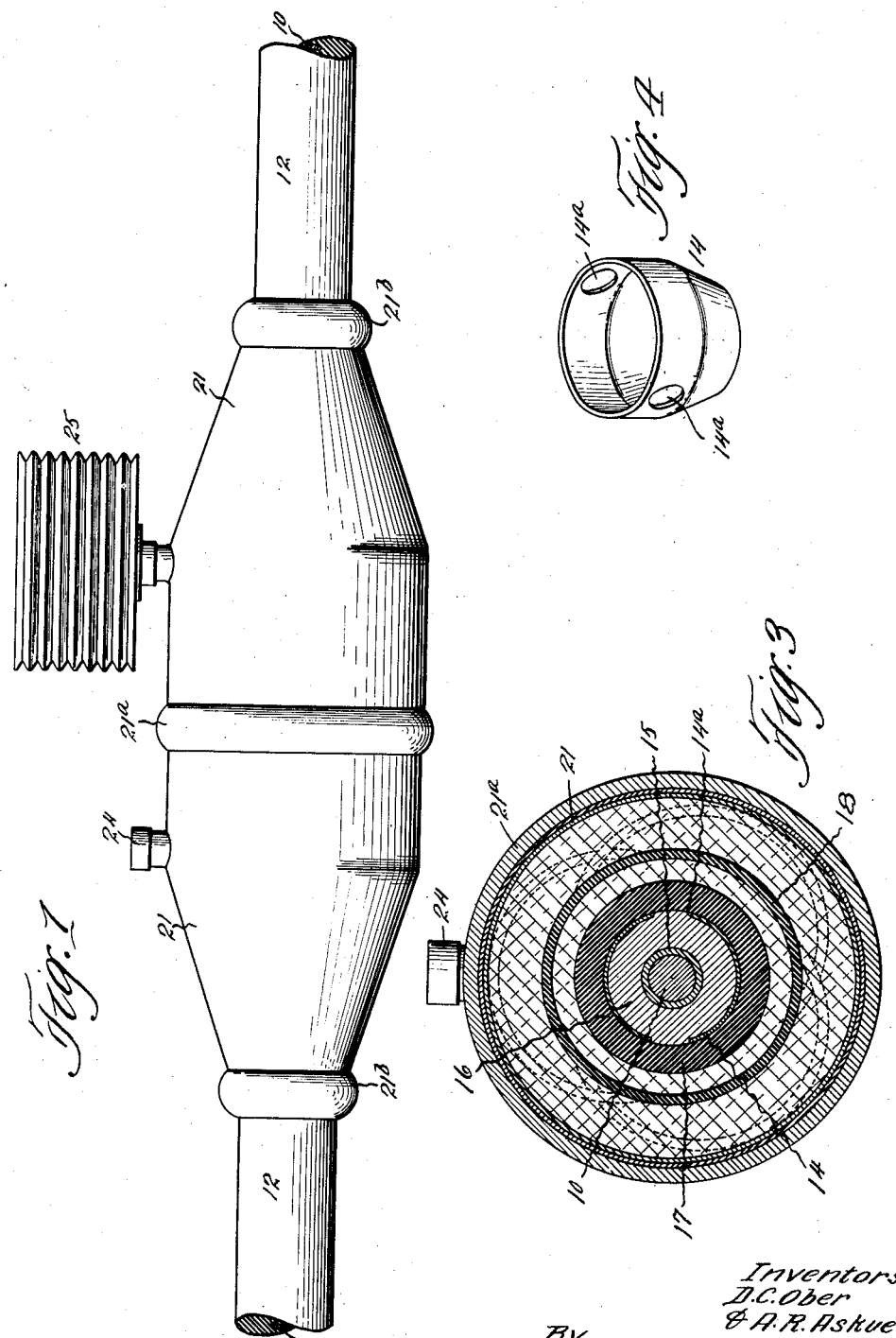

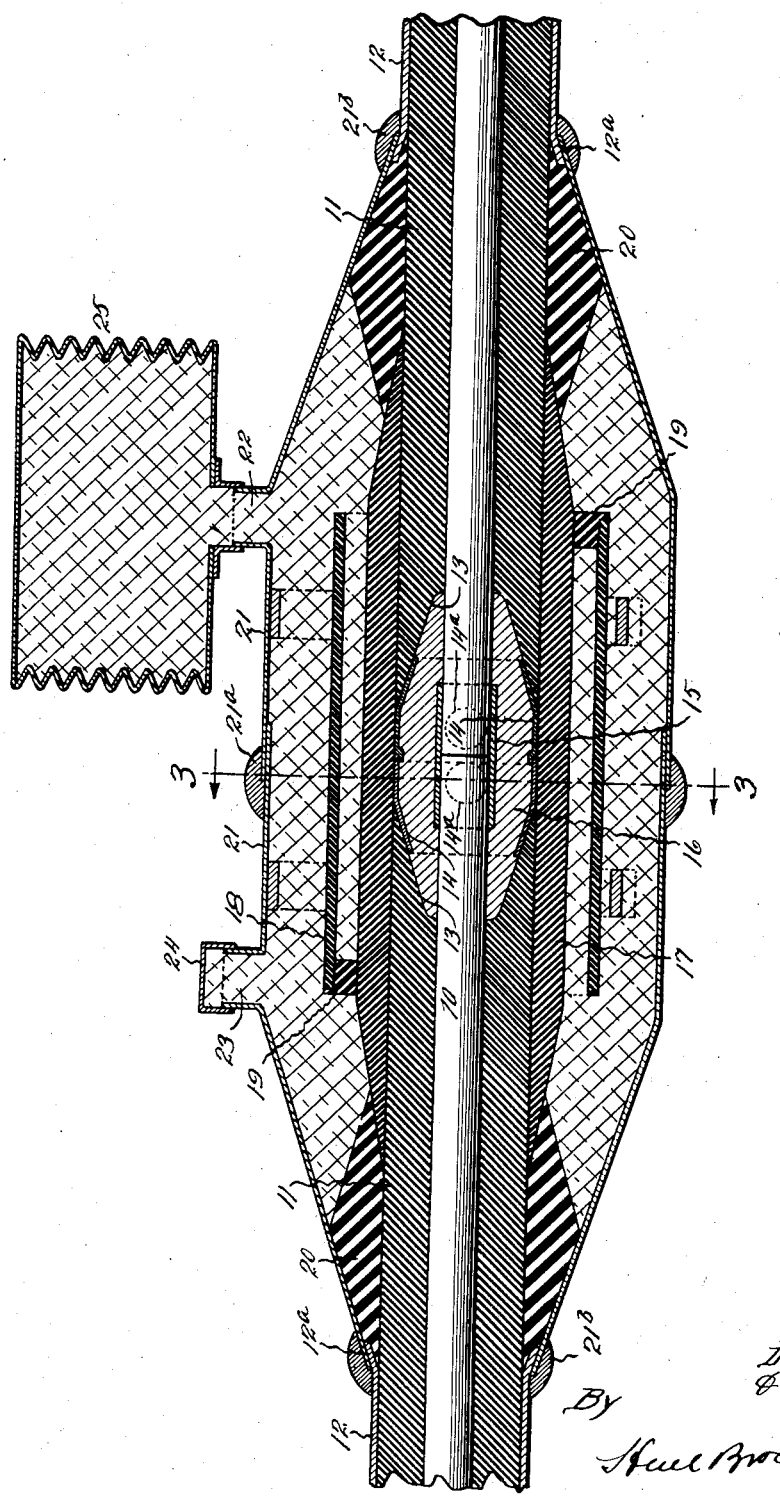

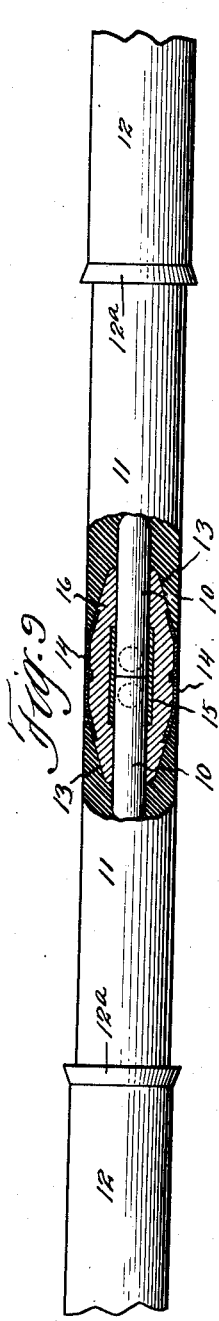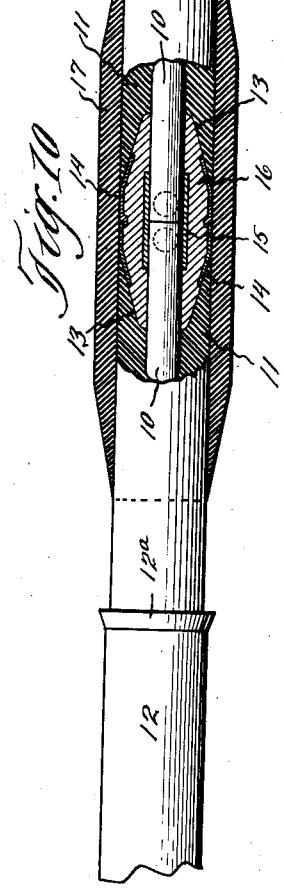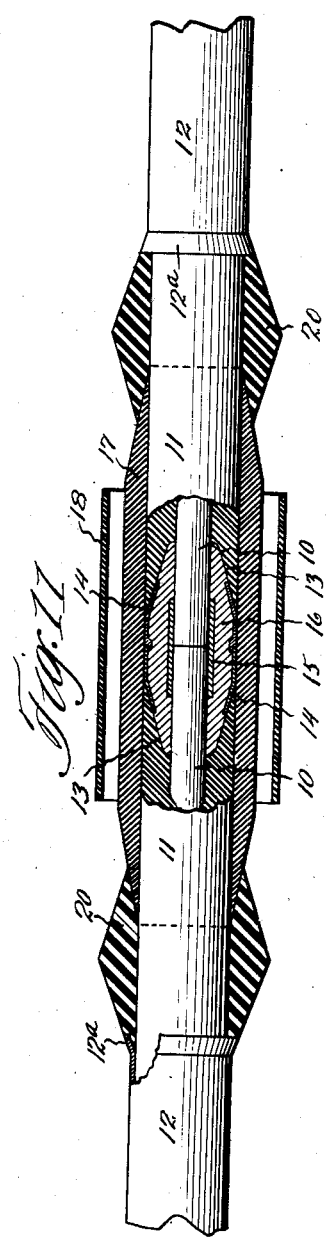

Patented Sept. 16, 1930

1,775,776

UNITED STATES PATENT OFFICE

DEAN C. OBER AND ALBERT R. ASKUE, OF EAST CLEVELAND, OHIO

JOINT FOR HIGH-VOLTAGE SINGLE-CONDUCTOR CABLES

Application filed October 1, 1923. Serial No. 665,794.

This invention is an improved joint for high voltage single conductor cables, which usually embody a central metallic conductor covered with factory wrapped insulation such as oiled paper, and this in turn surrounded by an outer covering of lead or similar material.

In making a joint between two sections of cable embodying these characteristics they should be joined in such a manner that the full current carrying capacity and the full insulation value of the cable itself are carried out in the joint.

The requisite current carrying capacity may be readily obtained, but to obtain the desired insulation in a joint of reasonable dimensions has always been more difficult, and it is with the object of providing a joint of reasonable dimensions and full insulation value that the present invention has been devised.

With this object in view, and certain others which will become apparent as the description proceeds, the invention consists in the novel features of construction, and in the manner of arranging or combining the same, all of which will be fully described hereinafter and pointed out in the appended claims.

In the drawings forming a part of this specification Fig. 1 is a side elevation of a cable joint constructed in accordance with our invention; Fig. 2 is a vertical longitudinal sectional view of the same; Fig. 3 is a section on the line 3—3 of Fig. 2; Fig. 4 is a detail perspective view showing the shells for forming the metallic connector; and Figs. 5 to 11 are detail sectional views showing the detailed steps in making the joint.

Referring to the drawings 10, 10 indicate the abutting ends of the metallic conductors of two cable sections, which conductors constitute the core of the cable, and which conductor sections are surrounded by factory applied insulation 11, the insulation being preferably paper impregnated with oil or similar material.

Surrounding the paper insulation 11 is the outer envelope sheath 12 of lead or similar material. These parts constitute the usual construction of high voltage single conductor cables.

As a first step toward making the joint, the insulation and lead sheath are cut away from each conductor section 10 exposing a short end, about one inch in length. The insulation at each such end is cut away in such manner as to provide a tapering annular recess, as shown at 13. This cutting is done by a special tool which is the subject matter of a separate application, entitled Cutter for removing cable insulation, Serial No. 672,683, filed November 3, 1923, and it will be noted that each recess 13 extends from the lead covering 12 to the central conductor 10 and is of considerable depth.

A thin brass shell 14 is then placed in each recess or cavity 13, these shells being in the form of open truncated cones and do not extend entirely to the contracted ends of the recesses or cavities. The shells are also provided with one or more openings 14ª for the introduction of solder.

The ends of the conductor are fitted into the opposite ends of a copper sleeve 15, and then by a suitable device the cable ends and shells are forced together, and at the same time these shells are forced tightly into the recesses or cavities 13 as they are bored smooth and the shells are shaped to fit snugly therein.

The copper sleeve is then sweated on to the ends of the conductor, the openings 14ª permitting the operation.

After the copper sleeve 15 has been sweated to the abutting ends of the conductors, solder 16 is introduced into the brass shells 14 which have been made to abut and this solder completely envelops the ends of the conductor and the copper sleeve and extends completely into the recesses or cavities cut in the insulation, and where the shell does not extend completely into the recess it has been found that this solder can be introduced at such a temperature as not to impair the insulation. The maximum diameter of each brass shell is substantially the same as the diameter of the wrapped insulation so that, by means of the brass shells introduced into the recesses or cavities and the filling of solder, we have the conductors connected together by a metallic connection which is substantially of the same diameter as the insulation and being of enlarged diameter and devoid of sharp corners or angles there will be greatly reduced stresses at the points where the metallic connector and the applied insulation meet. This metallic connector also serves as a plug to prevent longitudinal migration of the oil in the insulation 11.

The term connector is here employed to indicate the means for not only carrying current between the conductors at the joint, but also to distribute and direct the electric potential stresses to which the joint insulation is subjected. It will therefore be understood that while we have shown the brass shells as extending partially into the tapering recesses, these shells can be extended to completely fill the said recesses, or the brass shells could be omitted, and the solder molded directly into said recesses and completely fill the same and the connector would be complete so long as a device is provided which will serve the double function above referred to.

Before the metallic connector 16 and the copper connector 15 are applied, the lead covering 12 is stripped off to a considerable distance, and upon each end of the cable is placed one half of a thin sheet metal casing preferably of brass and the ends of the lead covering are belled outwardly as shown at 12ª for a purpose hereinafter explained.

After the ends of the conductor have been connected by solder, the joint thus far made is wrapped with insulating tape, preferably of paper, as shown at 17, this wrapping being applied preferably by machinery in order to exclude air and moisture, and this wrapping is preferably made slightly thicker at the center and tapers off at each end to the same diameter as the factory insulation.

After the machine wrapped insulation 17 has been applied, a shellac paper tube 18 is placed around the joint and is slightly spaced from the machine wrapped insulation by means of suitable spacers 19.

At each end of the machine wrapped insulation and extending beneath the belled ends of the lead covering is packed candle wicking 20 which is suitably impregnated and this wicking is narrowest at its ends and broadest at its central portion as most clearly shown, and then after applying suitable spacers to the shellac paper tube the sheet metal sections 21 of the outer casing are moved up and their abutting edges soldered together as indicated at 21ª and a joint 21ᵇ is produced at each end in order to make a tight connection at each end of the casing with the exterior lead covering of the cable.

This outer casing is preferably made of brass and in ordinary practice will be about 8 inches in diameter. The size however will be determined by the size of the cable and the interior portions of the joint or other factors.

The outer casing 21 is usually formed with two openings 22 and 23 and into one of these openings is poured thin petrolatum at a temperature of about 250° F. and this flow of petrolatum is continued until it exudes from the other opening 23, and after the casing has been filled and the interior portions of the joint completely enveloped, a cap 24 is applied to close the opening 23 and then a compound under pressure is applied to the other opening 22 for a period of approximately 18 hours, and after this a compensating reservoir 25 is inserted in the opening 22.

This compensating reservoir 25 is made of soft brass filled with hot compound and is substituted for the pressure cylinder.

The construction and manner of connecting this compensating reservoir constitutes the subject matter of a separate application entitled Compensating reservoir for sealed joints, Serial No. 665,810, filed October 1, 1923.

The parts constructed as herein shown and described constitute the complete joint of the high voltage cable and practice has demonstrated the efficiency of the same.

The joint constructed in the manner herein shown and described has all the advantages of wrapped insulation and likewise all the advantages of one employing a mobile insulating compound under pressure; and air and moisture are completely excluded. By the employment of the compensating reservoir, the complete filling of the compound in the joint is maintained during the load temperature cycles. By providing the tapering recesses or cavities in the ends of the factory insulation and providing intimate contact between the metallic connector and this insulation and at the same time avoiding sharp corners or angles, stresses at these points are greatly reduced. It will thus be seen that we provide a simple and highly efficient construction of joint and one which can be applied in the ordinary manhole and with reasonable rapidity.

Furthermore the joint possesses all the advantageous features of all the usual types and at the same time eliminates their objectionable features and also possesses capabilities impossible with all known types of joints.

Having thus described our invention, what we claim is:

1. In a joint for a pair of cable sections each having a conductor provided with insulation and a sheath of metal, said metal sheath and insulation being removed at the adjacent ends of the cable sections and said insulation of each section being provided with a tapering recess, a metallic connector applied to the meeting ends of the conductor sections and fitting snugly within the recessed ends of the cable insulation, and a shell fitting also in the recessed ends of the insulation and in which the metallic connector is molded.

2. In a joint for a pair of cable sections each having a conductor provided with insulation and a sheath of metal, said metal sheath and insulation being removed at the adjacent ends of the cable sections and said insulation of each section being provided with a tapering recess, a metallic connector applied to the meeting ends of the conductor sections, said connector being of a diameter substantially the same as the insulation, said connector being devoid of sharp edges and fitting into the recessed portions of the insulation, a sheet metal shell fitting also into said recesses and in which the metallic connector is molded.

3. In a joint for a pair of cable sections each having a conductor provided with insulation and a sheath of metal, said metal sheath and insulation being removed at the adjacent ends of the cable sections, said insulation of each section being provided with a tapering recess, a metallic connector applied to the meeting ends of the conductor sections, said connector being of a diameter substantially the same as the insulation and of substantially greater diameter than the conductor, said connector tapering towards its ends and devoid of sharp edges and fitting snugly into the recessed portion of the insulation, and a sheet metal shell fitting also into said recesses and in which the metallic connector is molded.

4. In a joint for a pair of cable sections each having a conductor provided with insulation and a sheath of metal, said metal sheath and insulation being removed at the adjacent ends of the cable sections, said insulation of each section being provided with a tapering recess, open truncated cones of thin metal received and snugly fitting within the tapering recesses, a metallic connector applied to the meeting ends of the conductor and completely filling the space defined by the truncated cones and the conductor, and insulating means housing said joint.

5. In a joint for a pair of cable sections each having a conductor provided with insulation, said insulation of each section being provided with a tapering conoidal recess around the conductor, open truncated cones of thin metal received and snugly fitting within the conoidal recesses with their larger ends abutting, and said cones having apertures for the introduction of a melted connecting metal for said conductors.

In testimony whereof, we hereunto affix our signatures.

DEAN C. OBER.
ALBERT R. ASKUE.